(12) United States Patent
Kong

(10) Patent No.: US 8,816,859 B2
(45) Date of Patent: Aug. 26, 2014

(54) TRAINING TOILET

(75) Inventor: James S. Kong, Palisades Park, NJ (US)

(73) Assignee: Rad Innovations, Palisades Park, NJ (US)

( * ) Notice: Subject to any disclaimer, the term of this patent is extended or adjusted under 35 U.S.C. 154(b) by 67 days.

(21) Appl. No.: 13/338,889

(22) Filed: Dec. 28, 2011

(65) Prior Publication Data

US 2013/0171597 A1    Jul. 4, 2013

(51) Int. Cl.
*G08B 23/00* (2006.01)

(52) U.S. Cl.
USPC ............ 340/573.1; 340/568.1; 340/825.19

(58) Field of Classification Search
USPC ............ 340/573.1, 565, 568.1, 571, 573.2, 340/573.3, 3.1, 825.19
See application file for complete search history.

(56) References Cited

U.S. PATENT DOCUMENTS

| | | | |
|---|---|---|---|
| 4,228,554 A * | 10/1980 | Tumminaro | 119/161 |
| 5,652,975 A | 8/1997 | Hoskin | |
| 5,749,324 A | 5/1998 | Moore | |
| 5,978,976 A * | 11/1999 | Chai | 4/483 |
| 6,028,520 A * | 2/2000 | Maehre | 340/573.1 |
| 6,041,737 A | 3/2000 | Hennigan | |
| 6,968,806 B2 | 11/2005 | Helwig | |
| 7,237,278 B1 * | 7/2007 | Scott | 4/661 |
| 7,786,875 B2 | 8/2010 | Wu | |
| 8,061,300 B2 * | 11/2011 | McElroy, Jr. | 119/61.55 |
| 2002/0189551 A1 | 12/2002 | Patterson | |
| 2005/0087143 A1 | 4/2005 | Doran | |
| 2006/0037549 A1 * | 2/2006 | Kim | 119/166 |
| 2008/0178817 A1 * | 7/2008 | Brewer | 119/163 |
| 2010/0064975 A1 | 3/2010 | McElroy, Jr. | |
| 2010/0258056 A1 | 10/2010 | Hong | |

FOREIGN PATENT DOCUMENTS

WO    WO 2004071182    8/2004

OTHER PUBLICATIONS

The above references were cited in the International Search Report of the corresponding International Application, PCT/JP2012/070314 dated Feb. 25, 2013.
The above references were cited in the International Search Report of the corresponding International Application, PCT/US2012/070314 dated Feb. 25, 2013.

* cited by examiner

*Primary Examiner* — Daniel Previl
(74) *Attorney, Agent, or Firm* — Cowan, Liebowitz & Latman, P.C.; Mark Montague, Esq.; Serge Krimnus, Esq.

(57) ABSTRACT

A training toilet design that can be adapted for either a dog or a cat or other animal and even for a young human child is disclosed. A space or enclosure receives the trainee and upon receipt a switch is actuated. The switch can either be a pressure actuated mechanical switch or a motion detector switch. In response to the switch changing state, a microcontroller is actuated to provide any one of a number of responses. Responses include an audible encouraging comment when the trainee exits and for when entering the toilet. A timing lapse programmed into the microprocessor can ensure that the exit message is played only when there has been a predetermined lapse time between the entrance and exit of the trainee. Modes that are provided by different combinations of these features are determined by a mode switch that is operable by the user.

15 Claims, 4 Drawing Sheets

TRAINING TOILET

This invention relates in general to training toilets and more particularly to a design which can be adapted for training animals such as dogs and cats or for the training of a baby.

BACKGROUND OF THE INVENTION

It is known to use a positive reinforcement message during toilet training to get use of the toilet on a regular basis. The known training toilets are not as widely used as might be the case for a number of reasons including, Applicant believes, a combination of cost, effectiveness and optimum reinforcement.

Accordingly, it is a major object of this invention to provide a training toilet that at a reasonable price will be effective and provide an appropriately optimized reinforcement message.

It is a related purpose of this invention to provide the above in a context which will be comfortably used by the party involved and also without requiring expensive or redundant features.

BRIEF DESCRIPTION

In brief, this invention involves a framework for holding a platform for receiving the trainee. The platform can be a seat or a pad or a base for holding kitty litter. The trainee can be a pet such as a dog or cat or can be a child. The presence of the trainee in the space above the platform is detected by a switch or sensor that provides a signal that enables a microcontroller to process a program that involves playing one or two audible reinforcement messages to the trainee. The sensor that provides this enabling signal to the microcontroller can be a weight responsive switch or a motion detector. Optimally, these messages will be in the voice of someone with whom the trainee is familiar such as an owner or parent.

It is important to provide a message when the trainee (animal or human child) gets off or out of the training toilet. Preferably, this message has to be provided at least a predetermined time period after the trainee is received on or in the training toilet to assure that the trainee has had time to use the toilet. Thus in a preferred embodiment, when the trainee gets on or in the training toilet and the enabling switch is actuated, a timing circuit causes a predetermined time period to lapse before the exit reinforcement message can be played Thus a combination of time lapse and exit response signal provides the a positive reinforcement message at a time which assures that the trainee has completed its waste operation. This will be referred to herein as Mode I.

A Mode II embodiment adds a feature to the Mode I embodiment. In Mode II, the microcontroller is programmed to respond to actuation of the enabling switch to further provide an initial positive reinforcement audio message when the trainee enters or gets onto the training toilet. This entering message is preferably different from the exit message.

A Mode III embodiment is like the Mode I embodiment except that there is no time lapse. The exit positive reinforcement audio message is played whenever the trainee gets off of or exits from the toilet.

A mode IV embodiment is like the mode II embodiment except that there is no time lapse. The entering positive reinforcement message is played when the trainee enters the toilet and the exit reinforcement message is played whenever the trainee exits the toilet.

The microcontroller is set by the user to the desired mode.

Common to all four modes is that a positive reinforcement message may be played when the trainee exits the toilet.

DESCRIPTION OF THE FIGURES

FIG. 1 shows essentially the platform 10, step tray 12, frame 14 and mesh 16 of the training toilet.

DESCRIPTION OF THE PREFERRED EMBODIMENTS

The three embodiments described herein are capable of operating in any one of four modes. The three embodiments are configured and sized for use with different trainees. All three embodiments operate in response to an enabling signal generated by a sensor (switch or motion sensor) changing state thereby providing the signals that causes a microcontroller 32 to execute one of the four programs preselected by the user. Each of the three embodiments can be set by the user to any one of the four modes described herein.

Figure 1:
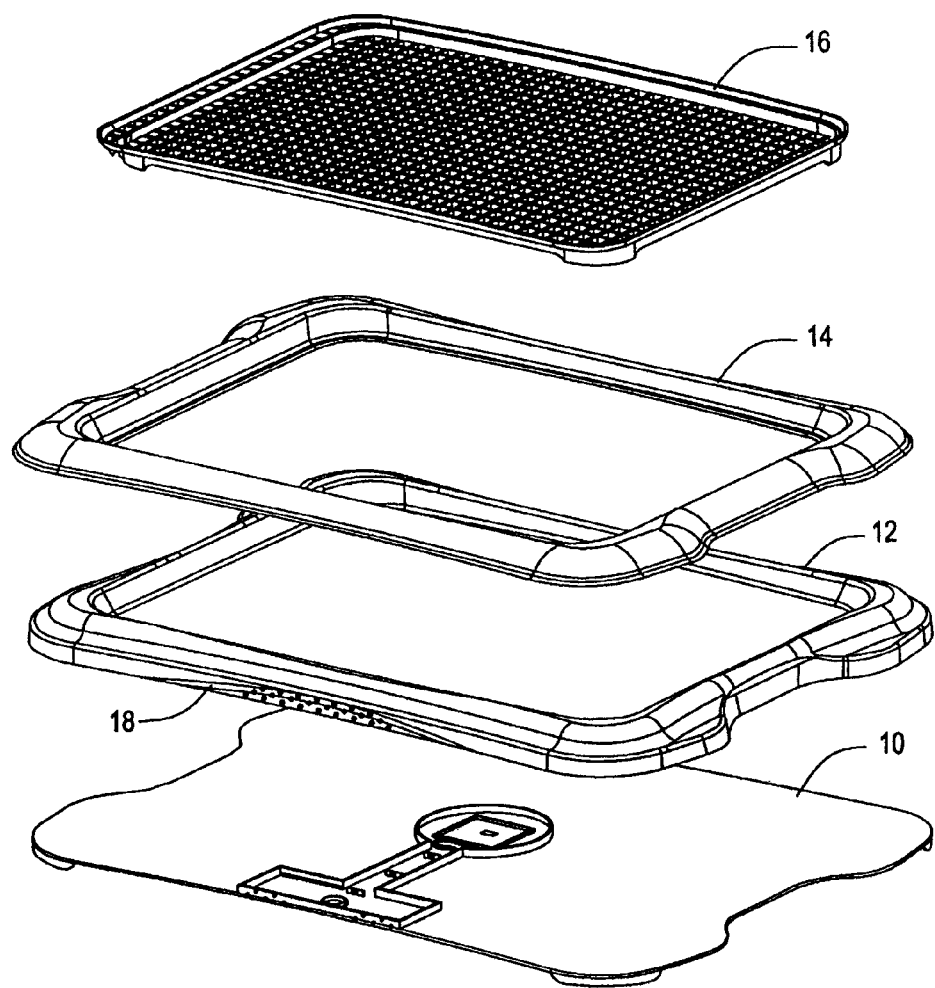
FIG. 1 is an exploded perspective view of an embodiment of the invention adapted for use in the training of a dog.
Figure 2:
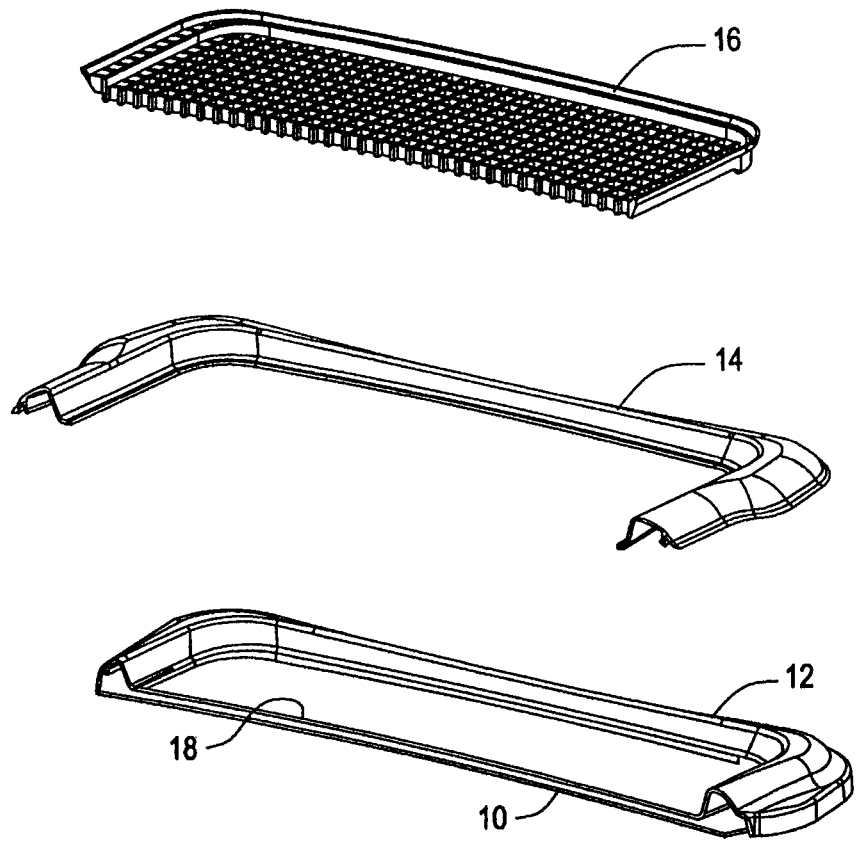
FIG. 2 is an exploded perspective view in cross-section through the upper portion of the FIG. 1 device showing the flexible resilient curved horizontal layer 18 which is deformed when the animal stands on the mesh 16 and which actuates the enabling switch 30 for the microcontroller 32 that controls the electronics and audio recordings. The layer 18, being resilient, returns to its normal non-contact state when the trainee exits.
Figure 3:
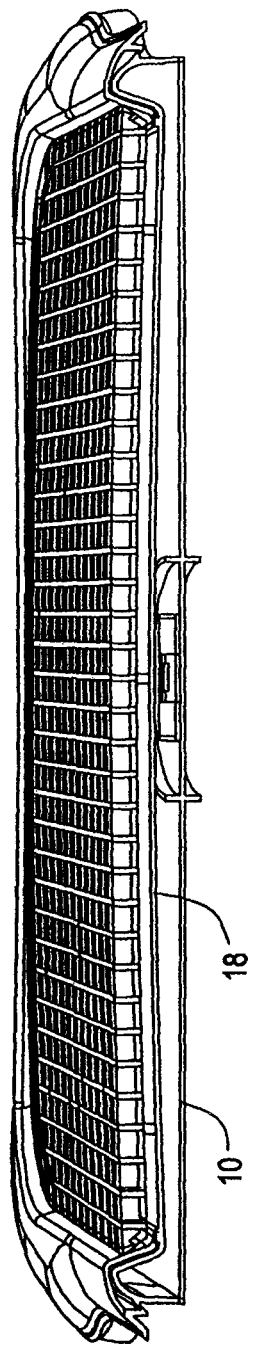
FIG. 3 is a perspective view of the device of FIGS. 1 and 2 assembled.

The first embodiment, shown in FIGS. 1, 2 and 3 is to a dog training toilet having a mesh 16 supported on a step tray 12 to receive the trainee, presumably a dog. A frame 14 holds the mesh 16 and step tray 12. The frame can hold other elements such as a moisture absorbing layer, as is known in the art. The step tray 12 is attached to a platform 10, which platform holds the electronics, The step tray 12 of the FIG. 1 device includes a flexible resilient slightly upward curved layer 18 which responds to the weight of the dog on the mesh 16. A normally open electric switch 30 is positioned between this curved resilient layer 18 and a rigid base 10. When the dog steps into the space above the mesh 16, The weight of the dog on the mesh 16 is transmitted to the flexible layer 18, causing the layer 18 to deflect downwardly and thus close the switch 30.

Closing the switch 30 provides an initiating enabling signal to the microcontroller 32. The microcontroller 32 then operates in one of the operator preselected modes to provide one or two audio messages. This FIG. 1 embodiment is adapted to train a dog but any appropriately sized animal can be the trainee.

Figure 4:
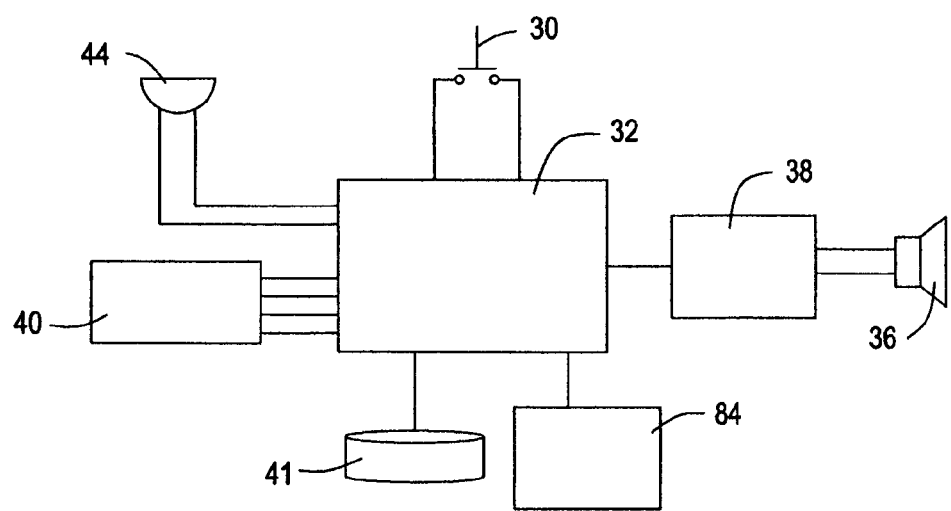
FIG. 4 is a block electrical schematic illustrating the electronic and audio devices and their relationship as employed in all embodiments of this invention.

FIG. 4 shows the electronic control arrangement that is associated with the user selecting any one of four modes of operation for the device of this invention. Closing of the enabling switch 30 Provides an initiating signal that causes the microcontroller 32 to control the timing of the one or two messages from the memory 34 that is delivered to the speaker 36 through the speaker driver 38.

The four position mode switch 40 determines the operation of the microcontroller 32 so that the system will operate in one of the four operating modes described above. The mode switch 40 is designed and positioned so that the user can select any one of the four modes. Each of the four leads 40*a*, 40*b*, 40*c* and 40*d*, provides a separate one of four selection signals to the microcontroller 32. Each of those four selection signals initiates a separate one of the four modes operation of the microcontroller 32. The four modes are set forth in the Brief Description.

It is known in the art how to program the microcontroller 32 for operation in each of the four modes. The change in state of the switch 30 provides a signal indicating that an animal has entered or exited from the space in which the trainee is received. In particular, when the trainee exits from the toilet, the switch 30 opens provides as an exiting signal a state change signal that controls or affects the timing of the playing of the exit message.

Battery 41 power is normally on at all times. Change in state of the enabling switch 30 is the signal that the microprocessor 32 is to operate in accordance with the operator preselected mode. The switch 30 is changed into its closed state in the dog toilet when the dog steps into the toilet and depresses the flexible resilient slightly domed layer 18. The switch 30 is changed into its open state when the trainee gets out of the toilet The switch 30 is a motion detector switch 53 in embodiments adapted for a cat trainee (see FIG. 5) or motion detector switch in embodiments adapted for human child trainee (see FIG. 6).

The battery 41 is a convenient source of energy for operating this device. The battery provides power at all times in the embodiments shown. However a manually operated line switch (not shown) can be included to save battery power during long term non-use.

memory 34 contains the positive reinforcement message or messages to be coupled to the speaker 36 in accordance with the mode selected by the user. The memory 34 may contain two messages so that in the modes II and IV, an entrance message is played in addition to the exit message played when the animal leaves the toilet.

It should be noted that the microphone 44 which is used to input the message for the memory 34 requires an analog to digital output unit which can be part of the microphone 44 or as a separate downstream item (not shown). Similarly, a digital to analog device (not shown) would be incorporated at the input to the speaker driver 38 as part of the driver 38 or as a separate item.

In another embodiment, a frame provides a space or enclosure which is adapted to receive an animal such as a cat. Once the cat enters into the space, a motion sensor is activated by the cat's movement to close the switch 30. Exit of the cat causes the motion detector to generate the open state of the switch 30. The floor of the interior of this device can be a standard arrangement such as one that employs kitty litter.

A further embodiment of the device of this invention is adapted to the training of a young human child. The device can be employed with either a weight detector switch which is responsive to the weight of the child or a motion sensor which is responsive to the movement of the child getting onto or off of the toilet involved. In the device, a frame provides a seat having a back surface within which is mounted an appropriate motion sensor to provide the enabling signal required for the operation of the FIG. 4 electronic and message providing arrangement. Once the enabling signal has been established, then the FIG. 4 arrangement operates in the one of the four modes preselected by the user or trainer or guardian of the child involved.

It is preferred that all four modes be provided in each embodiment. But a less flexible embodiment could be created that would provide fewer than all four modes.

What is claimed is:

1. A toilet for a pet animal comprising:
a substantially continuous base layer adapted to receive a standing pet animal,
a space above said base layer for receiving said pet animal,
a switch coupled to said base layer automatically changing state in response to receiving said pet animal on said base to provide an initiating state for said switch,
said switch automatically changing state in response to removal of said pet animal from said base to provide an exiting state for said switch,
said initiating state and said exiting state accompanied by first and second signals, respectively; said base layer is resilient, flexible and normally upwardly curved, said space is on top of said base layer and said switch is below said base layer, receipt of said pet animal on said base layer causes said base layer to deflect down and change state of said switch, removal of said pet animal from said space causes said resilient base layer to return to normal upwardly curved state and change the state of said switch.

2. The toilet of claim 1 further comprising:
an audio recorder responsive to said initiating state to play an initiating audible record as said first: signal.

3. The toilet of claim 2 wherein:
said audio recorder is further responsive to said exiting state to play an exiting audible record as said second signal.

4. The toilet of claim 3 wherein: said audio recorder plays said exiting audible signal only if said exiting state is generated a predetermined time after said initiating state.

5. The training toilet of claim 4 wherein:
said base layer is resilient, flexible and normally upwardly curved,
said space is on top of said base layer and said switch is below said base layer,
receipt of said pet animal on said base layer causes said base layer to deflect down and change the state of said switch,
removal of said pet animal from said space causes said resilient base layer to return to normal upwardly curved state and change the state of said switch.

6. The toilet of claim 2 wherein: said audio recorder plays said exiting audible signal oily if said exiting state is generated a predetermined time after said initiating state.

7. The toilet of claim 3 wherein: said initiating and exiting audible records are different.

8. The training toilet of claim 3 wherein:
said base layer is resilient, flexible and normally upwardly curved,
said space is on top of said base layer and said switch is below said base layer,
receipt of said pet animal on said base layer causes said base layer to deflect down and change the state of said switch,
removal of said pet animal from said space causes said resilient base layer to return to normal upwardly curved state and change the state of said switch.

9. The training toilet of claim 2 wherein:
said base layer is resilient, flexible and normally upwardly curved,
said space is on top of said base layer and said switch is below said base layer,
receipt of said pet animal on said base layer causes said base layer to deflect down and change the state of said switch, removal of said pet animal from said space causes said resilient base layer to return to normal upwardly curved state and change the state of said switch.

10. The training toilet of claim 6 wherein:
said base layer is resilient, flexible and normally upwardly curved,
said space is on top of said base layer and said switch is below said base layer,
receipt of said pet animal on said base layer causes said base layer to deflect down and change the state of said switch,
removal of said pet animal from said space causes said resilient base layer to return to normal upwardly curved state and change the state of said switch.

11. The toilet of claim 1 further comprising:
an audio recorder responsive to said exiting state to play an exiting audible record as said second signal.

12. The toilet of claim 11 wherein: said audio recorder plays said exiting audible signal only if said exiting state is generated a predetermined time after said initiating state.

13. The training toilet of claim 12 wherein:
said base layer is resilient, flexible and normally upwardly curved,
said space is on top of said base layer and said switch is below said base layer,
receipt of said pet animal on said base layer causes said base layer to deflect down and change the state of said switch,
removal of said pet animal from said space causes said resilient base layer to return to normal upwardly curved state and change the state of said switch.

14. The training toilet of claim 11 wherein:
said base layer is resilient, flexible and normally upwardly curved,
said space is on top of said base layer and said switch is below said base layer,
receipt of said pet animal on said base layer causes said base layer to deflect down and change the state of said switch,
removal of said pet animal from said space causes said resilient base layer to return to normal upwardly curved state and change the state of said switch.

15. A toilet for a pet animal comprising:
a plurality of modes for providing a positive reinforcement message to the pet animal, each of said modes being selectable by a trainer,
each of said modes providing an audio message activating signal to turn on a positive reinforcement message for the pet animal,
a first one of said selectable modes providing an exit message in response to the concurrence of (a) a time lapse at least equal to a predetermined time period after the entering of pet animal onto said toilet and (b) the exit of the pet animal from the toilet,
a second one of said selectable modes providing an entering message in response to the entrance of the pet animal onto said toilet and an exit message under the time lapse and exit conditions of said first mode,
a third one of said selectable modes providing an exit message whenever the pet animal exits said toilet,
a fourth one of said selectable modes providing an entering message in response to the entrance of the pet animal onto said training toilet and an exit message in response to the exit of the pet animal from the toilet; base layer is resilient, flexible and normally upwardly curved, space is on top of said base layer and switch is below said base layer, receipt of said pet animal on said base layer causes said base layer to deflect down and change state of said switch, removal of said pet animal from said space causes said resilient base layer to return to normal upwardly curved state and change the state of said switch.

* * * * *